Patented Nov. 17, 1925.

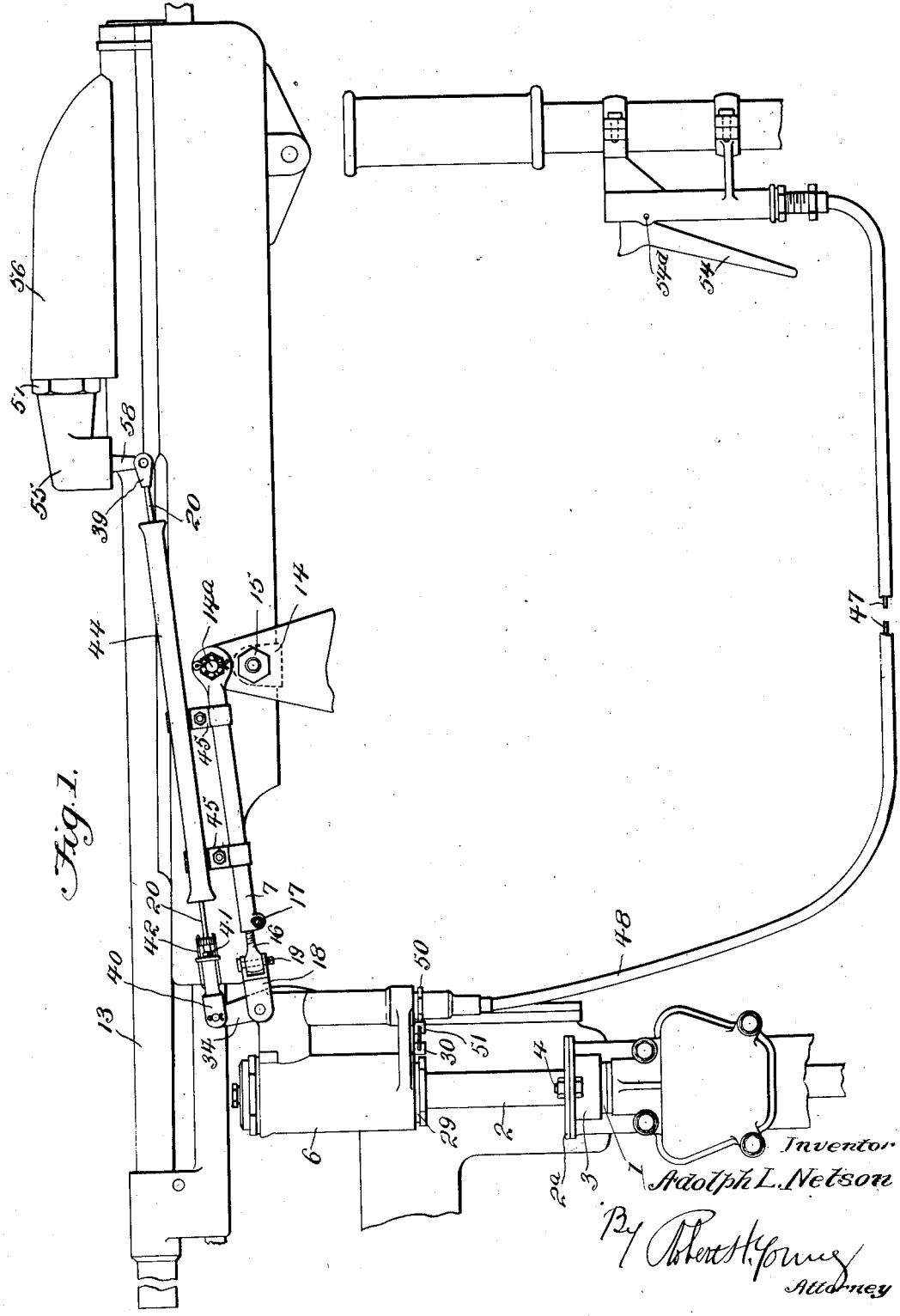

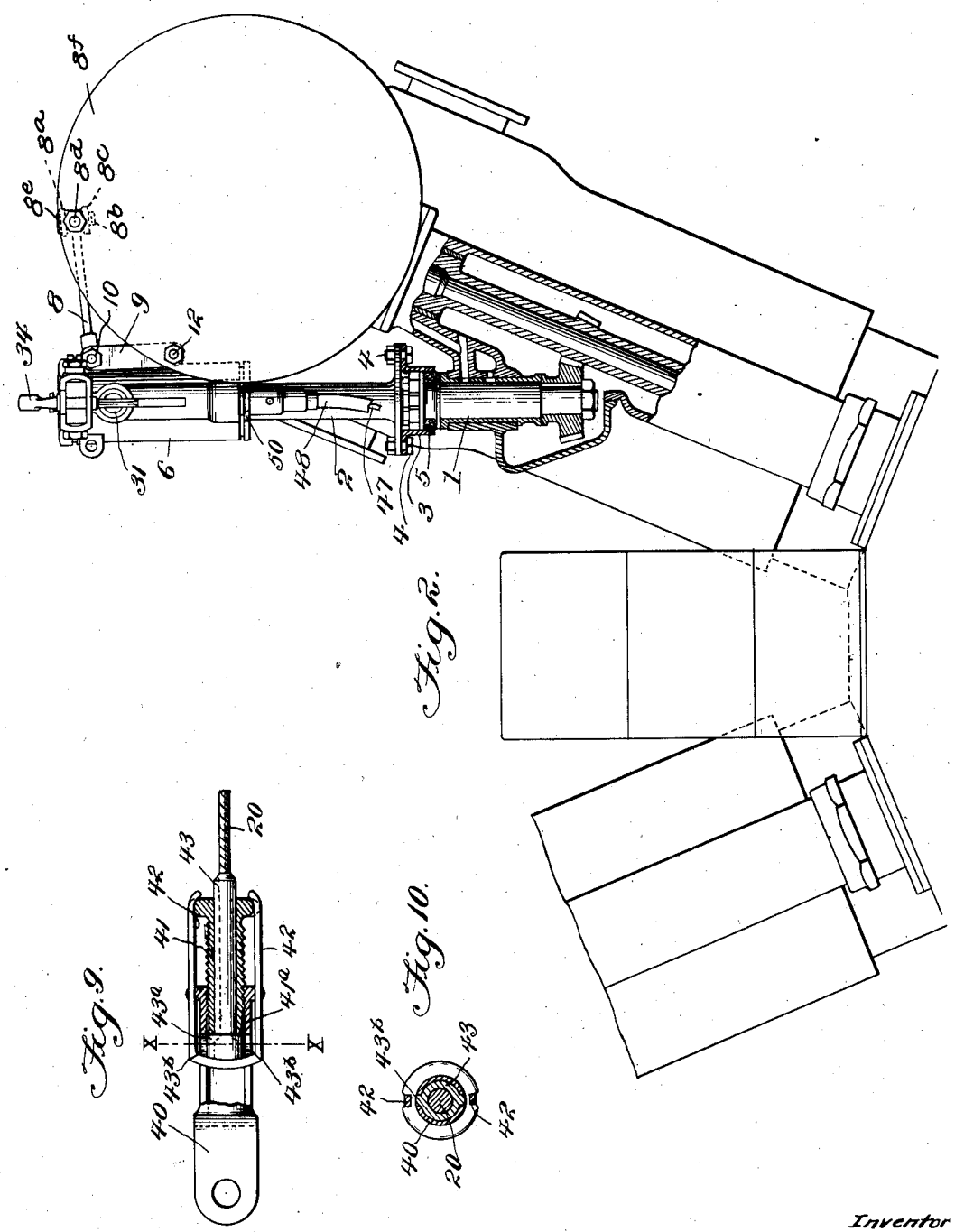

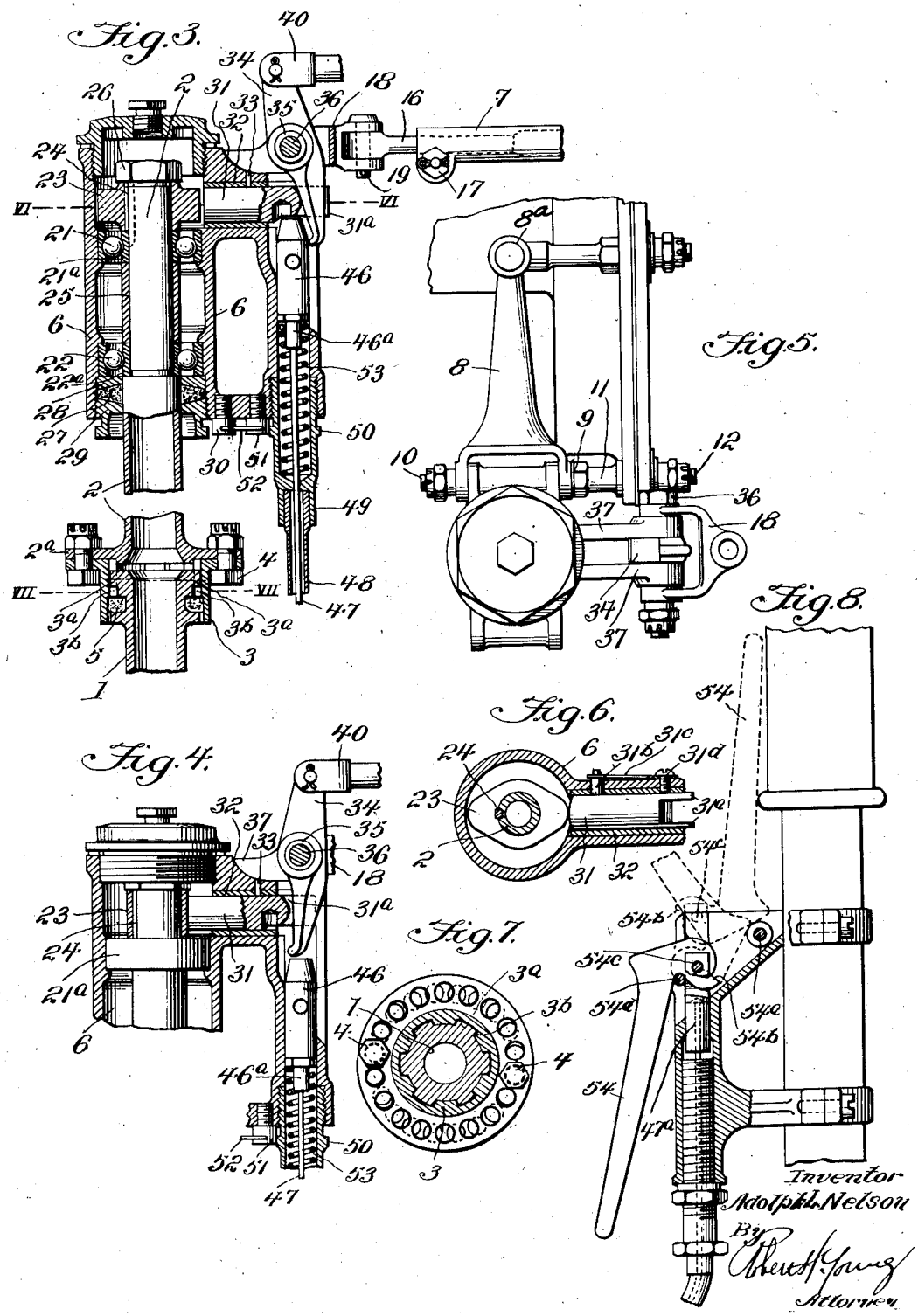

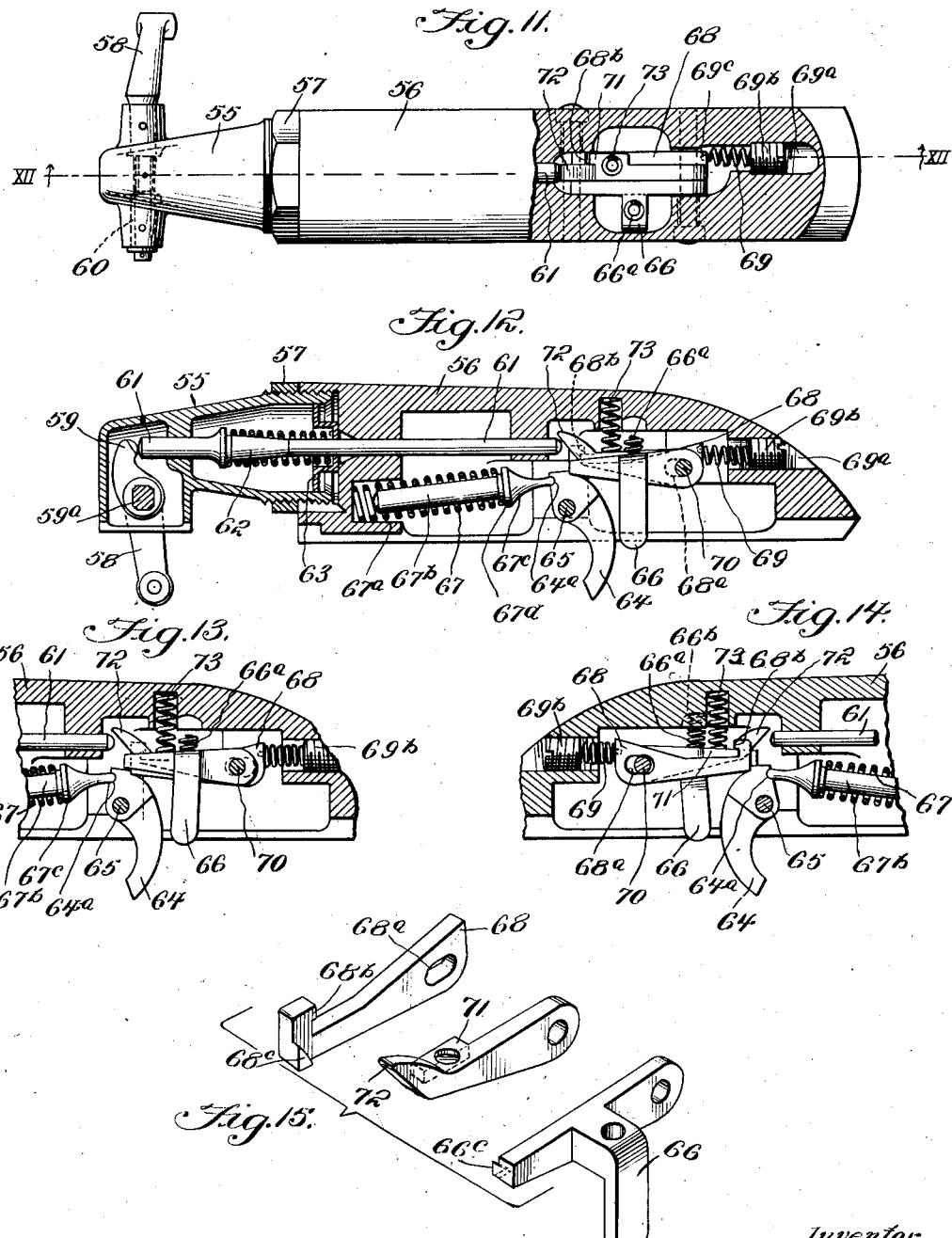

1,562,424

UNITED STATES PATENT OFFICE.

ADOLPH L. NELSON, OF INDIANAPOLIS, INDIANA.

CONTROL MECHANISM FOR AIRCRAFT GUNS.

Application filed June 6, 1919, Serial No. 302,278. Renewed March 31, 1925.

*To all whom it may concern:*

Be it known that I, ADOLPH L. NELSON, a citizen of the United States, residing at Indianapolis, in the county of Marion and State of Indiana, have invented certain new and useful Improvements in Control Mechanism for Aircraft Guns, of which the following is a specification.

This invention relates to aircraft guns and is directed particularly to mechanical construction features of a gun and gun control designed to be mounted on an airplane engine and to fire between the blades of a propeller.

The invention provides for the transmission of timing impulses from the propeller engine to the gun by direct mechanical connection, the details of which bear a very important relation to the success of the apparatus. In addition to the details of the mechanical connection between the engine and the gun, the invention provides also for the cooperation of this connection with a particular type of single shot trigger mechanism the details of which latter construction will be described hereinafter.

The present invention provides a light weight construction having few parts and which is simply and easily understood. The apparatus has proved very reliable and has demonstrated a capability of remaining in accurate adjustment. It has proved so reliable as to be used with four blade propellers, an arrangement which has not been successfully adopted by any other type of construction. The impulse portion of this apparatus is to be differentiated from those constructions involving the use of pressure waves on a column of liquid, which type of construction has always required constant inspection for the maintenance of the efficiency of the liquid pulsating column, though the trigger control mechanism may be used with this or any other type of synchronizing mechanism.

The invention is directed to the combination of the particular control means and the trigger mechanism, and also to the details of construction of each of these devices. These details and other features of the invention will be described and claimed in the following specification and claims and illustrated in the accompanying drawings in which:

Figure 1 is an assembly view illustrating the relative position of the gun and the impulse generator;

Figure 2 is an end view illustrating the method of installing the gun control on one row of cylinders of a V-type motor;

Figure 3 is a partial sectional view of the impulse generator showing the operating control plunger in the upper and non-firing position;

Figure 4 is a view corresponding to Figure 3 but illustrating the control plunger in the lower position;

Figure 5 is a top plan view of the impulse generator;

Figure 6 is a sectional view on line VI—VI of Figure 3;

Figure 7 upper part, is a sectional view taken on line VII—VII of Figure 3 showing the eighteen holes in the coupling flange;

Figure 8 is a view showing the relative position of the control handle on a joy stick;

Figure 9 is an enlarged sectional view of the tension adjusting device on the impulse cable;

Figure 10 is a sectional view taken on line X—X of Figure 9;

Figure 11 is a top view, partly broken away, of the trigger motor and trigger housing showing the positions of the trigger, trigger operating finger, and the sear;

Figure 12 is a vertical sectional view of the structure shown in Figure 11 illustrating the complete arrangement of the trigger motor and trigger mechanism with the hammer engaged by the sear;

Figure 13 is a fragmentary view showing the hammer disengaged from the sear and held by the trigger;

Figure 14 is a view similar to Figure 13 but from the opposite side; and

Figure 15 is an enlarged perspective view of the trigger operating finger, the trigger, and the sear.

Like parts in the various drawings are identified by like numerals.

The apparatus of the present invention is hereinafter subclassified in five principal groups which cooperate to form a complete structure. These groups are identified by the following titles and explanatory definitions.

The gun control drive consists of the mechanism and driving shaft for driving the impulse generator off of the cam shaft driving shaft of a V-type engine.

The gun control impulse generator is a device which generates the controlling or timing impulses, which, when transmitted to the machine gun trigger mechanism or trigger motor, synchronize the firing of the gun with the position of the propeller.

The impulse cable or connection cable is the connecting link between the impulse generator on the engine and the trigger motor mounted on the machine gun, the impulse generator being spaced from the trigger motor by a suitable thrust rod.

The operating cable is used to control the connection between the impulse generator and the trigger motor. The term "operating cable" is used to designate the cable operated by the gunner to set the gun in operation.

The trigger motor is a mechanism mounted on the machine gun which actually releases the hammer of the gun only when the propeller blades are in the safe position.

Referring in detail to the drawings Figure 1 shows a general assembly including the impulse generator, the generator thrust rod from the generator to the gun mount, the impulse cable connection, the operating control lever and the control cable, and the shaft extending into the impulse generator for operating the same. In the gun control driven assembly the gun control driving shaft 1 rotates at propeller speed, driving the generator cam shaft 2 through a semi-universal cam shaft coupling flange 3. The semi-universal joint is obtained by means of the drive shaft 1 having six male splines $3^a$ with a narrow face width. This may have a sliding fit into the cam shaft coupling flange 3 which has six female splines $3^b$ having a wider face to give sufficient lateral clearance. The coupling flange 3 is attached to the flange $2^a$ of the cam shaft 2 by two bolts 4. The cam shaft flange $2^a$ has twenty bolt holes and the coupling flange 3 has eighteen holes. This arrangement provides a vernier adjustment for timing the generator cam shaft 2 relative to the propeller by increments of two degrees.

The coupling 3 is lubricated by hard cup grease, packed on assembling. The grease is retained by a felt washer 5. When the gun is not firing the only load on the coupling 3 is that of driving the cam shaft 2 of the impulse generator which is negligible. Actual lubrication of the joint during service is therefore probably to be rarely required. The spline joint $3^a$, $3^b$, should not be tight; a play of .010 of an inch on the face of the splines has been shown to produce only approximately one degree error at the propeller, thus showing that a close fit is not required.

The generator housing 6 has a three point suspension, namely, the generator thrust rod 7; the generator torque arm 8; and the support spring 9. The generator torque arm 8 is fastened at one end to the generator housing by the torque arm bolt 10 and at the other end to a yoke which is secured to that portion of the engine cam shaft housing $8^f$ which is adapted to receive the distributor head for that bank of cylinders. This end of the torque arm 8 has a portion with a vertically disposed bore for the reception of a bolt $8^c$ adapted to secure this end of the arm 8 in a yoke $8^a$. This yoke $8^a$ forms the forward end of a bolt $8^d$ which is rigidly secured to the engine cam shaft housing $8^f$ by a suitable nut $8^e$. The generator thrust rod 7, the generator torque arm 8 and the supporting spring 9 support the generator housing independently of the cam shaft 2.

The shaped plate or bracket in Fig. 1 back of 2 and 6 is a showing of a portion of the cam shaft housing of the airplane engine, which cam shaft housing terminates rearwardly in the portion $8^f$, as shown. The torque arm 8 takes the torque of the generator housing 6; and the thrust rod 7 keeps the generator housing 6 at a constant distance away from the gun, regardless of vibration of the engine or gun mount, or deflections of the fuselage between the gun mount and the engine. The generator assembly is supported vertically by the laminated flat steel spring 9 fastened to the generator housing 6 by the torque arm bolt 10. The other end of the spring 9 is fastened to the cam shaft housing of the engine by a collar 11 and bolt 12, Fig. 3 and Fig. 5. The above method of supporting the generator housing 6, though simple, is of importance in reserving the correct timing between the impulse generator and the trigger motor. The method of attachment of the thrust rod 7 to the gun mount will be understood from the following description. As it is frequently necessary to take the gun 13 off of the gun mount 14 for cleaning, the thrust rod 7 should be fastened to the gun mount 14 independently of the gun mount bolt 15, so that even with the gun off of the mount 14 the impulse generator 6 is left properly supported should the engine be run. The thrust rod 7 is shown with one end secured to the gun mount at the point $14^a$ by a suitable fastening bolt. This plan of mounting is better than using the gun mount bolt 15 to secure the end of the thrust rod 7, because in the latter case dependence must be placed on mechanics to replace the gun mount bolt 15 after removing the gun 13; and should they fail to do so serious damage might result to the gun control mechanism.

The generator thrust rod 7 is adjustable for length. When installing the impulse generator the housing must be set vertically so that the generator cam shaft 2 will line up with the driving shaft 1. The generator support spring 9 will then be straight, flat, which is a close enough indication of the necessary alinement. It is not advisable to use a turnbuckle in the thrust rod 7 for the necessary adjustment as vibration might tend to loosen such a connection. The construction shown and recommended is an eye-bolt 16 screwing into the end of the thrust rod 7, and fitted with a clamping bolt 17, Fig. 1 and Fig. 3. The generator thrust rod yoke 18 and the pin therefor 19 are a part of this gun control design. The dimensions of the thrust rod 7 may vary with each plane and motor depending on the length required. The point of attachment of the thrust rod 7 to the gun mount 14 depends on the height the gun 13 is placed relative to the impulse generator 6. The thrust rod 7 should be of steel tubing, the impulse cable 20 being also of steel, in order to keep the temperature contraction and expansion changes of the thrust rod and the cable as near alike as possible, and thus keep the timing constant. The gun mount bolt 15 should have a good fit in the gun and in the mount 14. If a bolt is to be used at this point it should be so designed that the gun will not be cramped when the bolt is tightened. Certain types of guns have been found to be cramped and the action inside of the gun interfered with because of the springing of the side walls of the gun. In mounting such a gun it is necessary only to provide against turning of the generator, to position the same against vertical movement, and to permit the same to rock with the thrust rod while held against transverse motion.

A cross section of the impulse generator is shown in Figs. 3 and 4. The housing 6 preferably is formed of aluminum and constitutes an oil-tight casing for the cam motion. The generator cam shaft 2 runs on two ball bearings, the upper 21 and the lower 22. A double cam 23 is keyed to the shaft 2 by a key 24. The inner races 21ª and 22ª of the ball bearings 21 and 22, the bearing spacer 25, and the cam 23 have a snug sliding fit on the shaft 2, but are held firmly in place by a nut 26. These parts should have a snug sliding fit, and not a pressed fit, in order that assembling and disassembling may be readily accomplished. The housing 6 is made oil tight at the bottom by a lamp wick packing 27 held by a collar 28 and nut 29, the latter being locked by a screw 30. A tappet 31 runs in the bronze bushing 32, the latter being pressed into the housing 6 and secured in place by a pin 33. The rocker lever 34 oscillates on a steel bushing 35 which has a snug fit on the bolt 36. The bushing 35 and the slot in the mounting bracket 37 in which the rocker lever 34 is mounted, are both several thousandths of an inch wider than the rocker lever; therefore, when the thrust rod yoke bolt 36 is drawn up tight with the thrust rod 7 in place the rocker lever 34 is permitted to oscillate freely, while at the same time the bushing 35 and also the thrust rod yoke 18 are firmly held. The outer end of the tappet 31 is slotted at 31ª to take the rocker lever 34 and the inner end is rounded to follow the contour of the cam 23.

The gun control impulse connection cable 20 consists of a non-flexible steel cable with a fixed clevis 39 at one end and at the other end an adjusting clevis 40. A suitable size for such a cable has been found to be a 1/16th diameter No. 19 wire. The impulse cable 20 is used to transmit the cam action from the impulse generator 6 to the trigger motor on the gun, and the adjustment of the impulse cable 20 is for making the final adjustment when timing, after the generator cam 23 has been timed with the propeller. The impulse cable adjusting screw 41 is retained by the adjusting clevis spring 42. The impulse cable 20 runs through the impulse cable nipple 43 and is burred over and sweated. The nipple 43 has an integral collar 43ª on its forward end and this rests against the forward end 41ª of the adjusting screw 41. The collar 43ª has two ears 43ᵇ fitting in a slot 40ª cut in the clevis 40, preventing the impulse cable from turning when the adjusting screw 41 is turned. The slot 40ª also accommodates a spring 42 which is re-curved to engage the knurled outer end of the adjusting screw 41 to prevent the latter from turning within the clevis 40. The other end of the impulse cable 20 passes through a clevis 39 and is burred over and sweated. The burring over of the cable end and the sweating is a simple operation and when well done it has been shown by tests that the joint made is substantially equal to the strength of the cable, viz., 500 pounds. This is practically ten times the maximum strain imposed on the cable at propeller speeds of two thousand R. P. M. An impulse cable guard 44 is used to limit the vibration of the impulse cable 20 while permitting it to move longitudinally throughout its entire length. A light aluminum tube of 3/8th inch size and one thirty second inch wall thickness has been found to be serviceable. A convenient way of supporting the guard is shown in Fig. 1. Thrust rods 7 and lever actuating member 20 hence guard 44 are in substantially same plane. The brackets 45 are brazed to the thrust rod 7 and the impulse guard 44 is clamped by the brackets 45. The number of brackets 45 and the size of the thrust rod tube 7 depend on the length of the thrust rod required. In use the maximum compression force on the thrust rod is about fifty pounds. The generator thrust rod 7 and the impulse cable guard 44 should be considered as a part of the working structure and mounted with the same degree of care required for the installation of the other parts.

The operating cable plunger 46 is operated by cable 47 through an outer Bowden casing 48, the cap of which 49 fits into the recess of a spring retainer 50; the latter is locked in place by a screw 51 and a wire 52. The operating cable 47 passes through and is burred over and soldered into a plunger screw 46ª attaching it to the plunger 46. The plunger 46 is forced upward by a spring 53 and is pulled downward by a cable 47 operated from the usual airplane control lever operating cable lever 54. When the operating cable lever 54 is pressed up against the airplane control lever the plunger 46 is pulled down releasing the rocker lever 34 and the spring in the trigger motor, which will be described later, forces the tappet 31 against the cam 33 operating the moving parts in time with the cam. The amount which the plunger 46 is pulled down is determined by the adjustment given the operating cable adjusting screw. This screw should be so adjusted that the plunger 46 will clear the end of the rocker lever 34 by not more than $\frac{1}{16}$th of an inch. As the plunger 46 advances when firing is stopped, the tapered end thereof starts under the rocker lever 34 without effort until the cam 23 has forced the rocker lever 34 as far as the cam 23 lift permits. The spring 53 then forces the plunger 46 still farther up, rotating the rocker lever 34 a slight amount in addition to that given by the cam lift. To do this there must be no kinks in the Bowden cable housing; the cable should have a coat of vaseline before assembling in the tube, and all parts should move freely. The spring 53 is sufficiently strong to work properly when everything is working normally. For merely stopping firing, only a very light spring is required, since the tapered end of the plunger 46 starts under the end of the rocker lever 34 without any effort except the pulling of the operating cable 47 through its casing 48. The outer casing 48 is made for a size of wire larger than the size of the cable so that sufficient play may be provided.

The gun control trigger motor consists of the trigger motor housing 55 which is screwed into the trigger mechanism housing 56 and locked by a nut 57. From the outside of the trigger motor housing 55 the trigger lever crank 58 is operated by the impulse cable 20. The trigger lever 59 is provided with a square hole 59ª to take the trigger lever crank 58; the smaller diameter of the latter takes the trigger lever crank bushing 60. This design enables the trigger lever crank 58 to be placed on either side of the trigger motor housing 55 as may be required where a different installation may be desired, by shifting the bushing 60 to either side of the trigger motor housing 55. The trigger lever 59 operates the trigger lever plunger 61 in one direction and the trigger lever spring 62 operates it in the opposite direction. The spring 62 is seated in the spring cap 63 which is centered by the housing 55, thus relieving the plunger 61 of any friction that might be caused by the cap 63. The trigger motor housing 55 is provided with oil holes for oiling the moving parts. For shooting at high altitudes the parts should be put together substantially free from oil. All these parts should have liberal working clearances to avoid excessive friction which might be caused by the oil becoming congealed. Therefore the housing preferably should be made of bronze and the other part of hardened and ground steel; they can therefore run dry precluding any possibility of freezing up from congealed oil.

The trigger and hammer mechanism will be understood from the following description. The hammer 64 is pivoted on a screw 65 in the position shown in Figs. 11–14 inclusive and is held by the safety sear 66 against the force of the hammer spring 67. One end of the hammer spring 67 rests in a seat 67ª formed in the housing 56. The main portion and opposite ends of the spring 67 is supported on a centering plunger 67ᵇ which latter has a tip 67ᶜ fitting into a depression 64ª in the upper end of the hammer 64. The spring 67 is compressed between the seat 67ª and an annular shoulder 67ᵈ on the centering plunger. The bolt which cocks the hammer 64 by sliding back under the end of the hammer by the force of the gas piston of the gun is not shown in the drawings. After the cartridge is locked in the chamber of the barrel, the last movement of the forward action of the gas piston operates the sear 66, raising it against the action of the sear spring 66ª which is seated in the depression 66ᵇ in the housing 56, thus releasing the hammer 64. The hammer 64 can only fall through a small angle until it is caught by the trigger sear 68. Fig. 14 shows the mechanism from a side opposite to that shown in Fig. 12 and illustrates the trigger sear 68 to better advantage. In Fig. 14, the hammer is shown cocked held by the trigger sear 68. In the view shown in Fig. 12 and the view shown in Fig. 13 the trigger mechanism is shown in two different positions, in the former the hammer 64 is held by the safety sear and in the latter the safety sear has been raised and the hammer is held by the lower edge of the trigger sear. The operation of the trigger mechanism will be understood from the following description. When the hammer 64 is released by movement of the safety sear 66 it is caught by the trigger sear 68 which is forced back against the spring 69; the trigger sear 68 has an oblong hole 68ª fitting over a screw 70 which oblong hole permits the trigger sear 68 to slide back a short distance. The trigger 68 is forced back by the hammer until the hook 68ᵇ, shown on its forward end, engages the projection 71 on the trigger sear operating finger 72. Then as the operating finger 72 is raised by the backward motion of the trigger lever plunger 61 the projection 71 on the trigger sear operating finger raises the trigger sear 68 which thus releases the hammer 64; the latter then falls, striking the firing pin, not shown. As soon as the hammer 64 is released the trigger sear 68 is forced forward and downward again by the spring 69, releasing the hook 68ᵇ of the trigger 68 from the projection 71 on the trigger sear operating finger 72, and allowing the trigger sear 68 to drop into position to again engage and hold the hammer 64 after the latter has been cocked by the gas piston and released by the safety sear 66. The spring 69 is seated in an opening 69ª formed in the housing 56 and is positioned and tensioned by a plug 69ᵇ screw-threaded into the housing 56. The opposite end of the spring 69 bears against the trigger sear 68, which latter is provided with a small depression to receive the spring end as indicated at 69ᶜ. The safety sear has a lateral projection 66ᶜ and the trigger 68 has a corresponding projection 68ᵉ which extend under the trigger sear operating finger 72 and serve to limit the upward movement of the two parts and the downward movement of the finger 72. If the trigger sear operating finger 72 is in its raised position when the hammer 64 is released by the sear 66, the trigger sear 68 cannot move back on account of the upper portion of the hook 68ᵇ on the trigger sear 68 bearing against the projection 71 on the trigger sear operating finger 72; but as soon as the latter is released by the forward movement of the trigger lever plunger 61 it is forced downward by the spring 73 which is seated in the depression 73ª formed in the housing 56; the projection 71 on the trigger sear operating finger 72 then engages beneath the hook 68ᵇ on the trigger sear 68 and allows the hammer 64 to force the trigger sear 68 back. On the next backward stroke of the trigger lever plunger 61 the trigger sear operating finger 72 is again raised, taking with it the trigger sear 68 and thus releasing the hammer 64. It will be noted that in this mechanism only one shot can be fired by one backward movement of the trigger lever plunger 61; that strokes of the trigger lever plunger 61 are ineffective if started before the sear 66 has released the hammer 64; and that it is impossible to obtain a shot fired as a result of the movement of the sear. The sear 66 must release the hammer 64 before the trigger sear 68 can be acted upon by the gun control mechanism for the reason that it is the actual pressure of the hammer which has been released by the sear which makes it possible for the engagement of the trigger sear operating finger 72 with the trigger sear 68.

The single shot mechanism just described, as adapted to be operated by an impulse receiving means moving synchronously with the propeller of the aircraft, is one of the most important features of my invention. It has been explained, and will be readily understood, that but one shot can be fired with this mechanism for every impulse received from the synchronizer transmission means. In the fire control devices of which I have heretofore been aware, the automatic gun once set in operation operates purely as an automatic gun until interrupted in its firing by the interposition of some element controlled by the synchronizing mechanism. While such a device may be designed to operate satisfactorily at certain given speed it will not operate at all satisfactorily at critical speeds above and below the given speed. With my device the firing of the gun is definitely controlled and can fire only once for each propeller revolution irrespective of the speed of revolution of the propeller and then only when the impulse transmission means is operated.

In the sectional view shown in Fig. 6 the relative positions of the cam 23 and the tappet 31 are shown. A device is provided for preventing chattering of the tappet 31 against the cam 23. This device is formed by a plunger 31ᵇ which is seated in an opening extending through the casing wall 6 and through the bushing 32 at right angles to the tappet. The inner end of this plunger 31ᵇ bears against the tappet 31 and is yieldably held thereagainst by the action of a spring 31ᶜ mounted on the exterior of the casing 6 and secured by a screw 31ᵈ. The plunger 31ᵇ in lightly bearing on the tappet 31 dampens the movements thereof and serves to hold the tappet in a position away from the cam 23 after the latter has driven the tappet to its extreme position. If this dampening action is not provided the tappet may rebound and come to rest immediately adjacent the cam and in a position where the cam could touch it during the revolutions of the cam and cause a constant chattering.

In Fig. 8 views are shown of the control handle 54 in different positions. When in the raised and firing position, pressed upward and against the joy stick, the handle 54 is fulcrumed on a cross pin or roller 54ª thus tending to elevate the inner end 54$^b$ of the lever and likewise to elevate the plunger 47$^a$ by means of the pin 54$^c$ against the tension of the spring 53. 54$^d$ is a pin limiting movement of the cable operating lever.

What I claim is:

1. In combination, an automatic gun, a firing mechanism for said gun, and a single shot mechanism controlling the operation of said firing mechanism, and means for operating said single shot mechanism synchronously with a given movable member.

2. In combination, an automatic gun, a single shot mechanism controlling the firing of said gun, and means movable in a given continuous cycle synchronously with a given movable member and adapted at a predetermined point in said cycle to actuate said single shot mechanism, said last named means having sole firing control of the operation of said mechanism.

3. In combination, an automatic gun, a single shot mechanism controlling the firing of said gun, means movable in a given continuous cycle and adapted at a predetermined point in said cycle to actuate said single shot mechanism, and means adapted to actuate said movable means, said last named means moving synchronously with a given movable member.

4. In combination, an automatic gun, a single shot mechanism controlling the firing of said gun, means movable in a given cycle and adapted at a predetermined point in said cycle to actuate said single shot mechanism, a moving member, and means moving synchronously with said moving member and adapted to actuate said movable means.

5. In combination, an automatic gun, a single shot mechanism controlling the firing of said gun, and impulse receiving means movable in a given continuous cycle synchronously with a given movable member and adapted at a predetermined point in said cycle to actuate said single shot mechanism.

6. In combination, an automatic gun, a single shot mechanism controlling the firing of said gun, impulse receiving means movable in a given cycle and adapted at a predetermined point in said cycle to actuate said single shot mechanism, and means for transmitting an impulse to said impulse receiving means.

7. In combination, an automatic gun, a single shot mechanism controlling the firing of said gun, impulse receiving means movable in a given cycle and adapted at a predetermined point in said cycle to actuate said single shot mechanism, a moving element, and means for synchronizing the movement of said impulse receiving means with the movement of said moving element.

8. In combination, an automatic gun, a single shot mechanism controlling the firing of said gun, an impulse receiving means movable in a given cycle and adapted at a predetermined point in said cycle to actuate said single shot mechanism, an engine, and transmission means adapted to transmit synchronously motion from said engine to said impulse receiving means.

9. In combination, an automatic gun, a firing mechanism controlling the firing of said gun, impulse receiving means movable in a given predetermined continuous cycle, said impulse receiving means being adapted to actuate said firing mechanism to fire but one shot during each cycle of its motion, and means for transmitting motion to said impulse receiving means.

10. In combination, an automatic gun, a firing mechanism controlling the firing of said gun, impulse receiving means movable in a given predetermined continuous cycle, said impulse receiving means being adapted to actuate said firing mechanism to fire but one shot during each cycle of its motion, a movable element, and means for transmitting motion to said impulse receiving means synchronously with the motion of said movable element.

11. In combination, an automatic gun, a firing mechanism controlling the firing of said gun, impulse receiving means movable in a given predetermined continuous cycle, said impulse receiving means being adapted to actuate said firing mechanism to fire but one shot during each cycle of its motion, an engine, and means for transmitting motion to said impulse receiving means synchronously with the motion of said movable element.

12. In combination, an automatic gun, a firing mechanism therefor, means movable in a given cycle and adapted to actuate said firing mechanism, said firing mechanism being adapted to permit but one shot to be fired during each cycle of movement of said movable means and to preclude firing from any other means except through said movable means.

13. In combination, an automatic gun, a firing mechanism therefor, means movable in a given cycle and synchronously with a movable element, and adapted to actuate said firing mechanism, said firing mechanism being adapted to permit but one shot to be fired during each cycle of movement of said movable means and to preclude firing from any other means except through said movable means.

14. A gun control assembly including a support, a gun mounted on said support, an impulse generator, a lever member attached to the firing mechanism of said gun, an impulse transmission operated by said trigger control motor and connected with said lever member.

15. A gun control assembly including a support, a gun mounted on said support, an impulse generator, a lever member attached to the firing mechanism of said gun, an impulse transmission operated by said trigger control motor and adjustably connected with said lever member.

16. A gun control assembly including a support, a gun mounted on said support, an impulse generator, connective bracing means between said impulse generator and said support, a lever member connected to the trigger mechanism of said gun, and a connection between said impulse generator and said lever member and arranged to be in substantially the same plane with said bracing means.

17. A gun control assembly including a support, a gun mounted on said support, an impulse generator, a plurality of connective bracing means for said impulse generator providing a three-point mounting for said impulse generator, a lever member connected to the trigger mechanism of said gun, and a connection between said impulse generator and said lever member and arranged to be in substantially the same plane with one of said bracing means.

18. A gun control assembly including a support, a gun mounted on said support, an impulse generator, a plurality of connective bracing means for said impulse generator providing a three-point mounting for said impulse generator, a lever member connected to the trigger mechanism of said gun, and an adjustable connection between said impulse generator and said lever member and arranged to be in substantially the same plane with one of said bracing means, said connection being capable of being either lengthened or shortened.

19. A gun control assembly including a support, a gun mounted on said support, an impulse generator connected to said support, a lever member connected to the trigger mechanism of said gun, a connection between said impulse generator and said lever member, power means for actuating said impulse generator, a two-part driven shaft between said power means and said impulse generator, and adjusting means connected to said driven shaft for positioning one end of said shaft with respect to the other.

20. A gun control assembly including a support, a gun mounted on said support, an impulse generator connected to said support, a lever member connected to the trigger mechanism of said gun, a connection between said impulse generator and said lever member, power means for actuating said impulse generator, a two-part driven shaft between said power means and said impulse generator, and adjusting means connected to said driven shaft for positioning one end of said shaft with respect to the other, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

21. A gun control assembly including a support, a gun mounted on said support, an impulse generator connected to said support, a lever member connected to the trigger mechanism of said gun, a connection between said impulse generator and said lever member, power means for actuating said impulse generator, a two-part driven shaft between said power means and said impulse generator, and adjusting means connected to said driven shaft for positioning one end of said shaft with respect to the other, said adjusting means comprising complementary adjacent coupling members capable of rotatable adjustment with respect to each other, and clamping means for securing said coupling members together in any predetermined relation.

22. A gun control assembly including a support, a gun mounted on said support, an impulse generator connected to said support, a lever member connected to the trigger mechanism of said gun, an adjustable connection between said impulse generator and said lever member and capable of being lengthened or shortened, power means for actuating said impulse generator, a two-part driven shaft between said power means and said impulse generator, and adjusting means connected to said driven shaft for positioning one end of said shaft with respect to the other.

23. A gun control assembly including a support, a gun mounted on said support, an impulse generator connected to said support, a lever member connected to the trigger mechanism of said gun, an adjustable connection between said impulse generator and said lever member and capable of being lengthened and shortened, power means for actuating said impulse generator, a two-part driven shaft between said power means and said impulse generator, and adjusting means connected to said driven shaft for positioning one end of said shaft with respect to the other, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

24. A gun control assembly including a support, a gun mounted on said support, an impulse generator connected to said support, a lever member connected to the trigger mechanism of said gun, an adjustable connection between said impulse generator and said lever member and capable of being either shortened or lengthened, power means for actuating said impulse generator, a two-part driven shaft between said power means and said impulse generator, and adjusting means connected to said driven shaft for positioning one end of said shaft with respect to other, said adjusting means comprising complementary adjacent coupling members capable of rotatable adjustment with respect to each other, and clamping means for securing said coupling members together in any predetermined relation.

25. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, and power means for actuating said trigger control motor.

26. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other.

27. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

28. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other, said adjusting means comprising complementary adjacent coupling members capable of rotatable adjustment with respect to each other, and clamping means for securing said coupling members together in any predetermined relation.

29. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring.

30. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

31. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring, said adjusting means comprising complementary adjacent coupling members capable of rotatable adjustment with respect to each other, and clamping means for securing said coupling members together in any predetermined relation.

32. A gun control assembly including a support, a gun mounted on said support, an impulse generator connected to said support, a lever member connected to the trigger mechanism of said gun, an adjustable connection between said impulse generator and said lever member and capable of being lengthened or shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring.

33. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

34. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, adjusting means connected to said driven shaft for positioning one end of said shaft with respect to the other, a cam member in said impulse generator secured to said driven shaft and adapted to rotate therewith, and a plunger slidably mounted in said impulse generator and adapted to engage with said cam member and to transmit impulses to said second lever member to overcome the tension of said spring, said adjusting means comprising complementary adjacent coupling members capable of rotatable adjustment with respect to each other, and clamping means for securing said coupling members together in any predetermined relation.

35. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, and power means for actuating said impulse generator.

36. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other.

37. A gun control assembly including a support, a gun mounted on said support, an impulse generator connected to said support, a lever member connected to the trigger mechanism of said gun, a connection between said impulse generator and said lever member, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator control, and adjusting means connected to said driven shaft for positioning one end of said shaft with respect to the other, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

38. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other.

39. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other, said adjusting means comprising complementary face plates secured to adjacent ends of said two-part shaft and each having a series of holes therethrough, said plates being capable of rotatable adjustment with respect to each other, and fastening bolts for said holes for securing said face plates in any predetermined position relative to each other.

40. A gun control assembly including a support, a gun mounted on said support, an impulse generator connected to said support, a lever member connected to the trigger mechanism of said gun, an adjustable connection between said impulse generator and said lever member and capable of being lengthened and shortened, a spring mounted in conjunction with said lever member to hold it normally in one extreme position, a second lever member secured to said connection and adapted to be operated by said impulse generator and through said connection to overcome the tension of said spring, power means for actuating said impulse generator, a two-part driven shaft between said power means and said impulse generator, and adjusting means connected to said driven shaft for positioning one end of said shaft with respect to the other, said adjusting means comprising complementary adjacent coupling members capable of rotatable adjustment with respect to each other, and clamping means for securing said coupling members together in any predetermined relation.

41. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, and a lever mounted on said casing and adapted to be actuated by said plunger.

42. In a gun control assembly, a gun firing synchronizing control motor comprising a casing, a driven shaft extending into said casing, a cam member within said casing and mounted to rotate with said shaft, a bushing mounted in said casing and extending at right angles to the axis of said cam, a plunger slidably mounted in said bushing and adapted to engage with said cam member, and a lever mounted on said casing and adapted to be actuated by said plunger.

43. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a spring pressed dampening member mounted on said casing and in constant yielding engagement with said plunger, and a lever mounted on said casing and adapted to be actuated by said plunger.

44. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a spring pressed dampening member mounted on said casing and adapted to exercise a constant yielding pressure on said plunger and at right angles to the line of motion thereof, and a lever mounted on said casing and adapted to be actuated by said plunger.

45. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a lever mounted on said casing and adapted to be actuated by said plunger, and a slidably mounted detent member adapted to engage said lever and prevent the movement thereof.

46. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a lever mounted on said casing and adapted to be actuated by said plunger, and a slidably mounted detent member adapted to engage said lever and prevent the movement thereof and hold it in one extreme position and not subject to actuation by said plunger.

47. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a lever mounted on said casing and adapted to be actuated by said plunger, a slidably mounted detent member adapted to engage said lever and prevent the movement thereof and hold it in one extreme position and not subject to actuation by said plunger, and a spring cooperating with said detent member to normally hold said detent member in engagement with said lever.

48. In a gun control assembly, a gun firing synchronizing control motor comprising a casing, a driven shaft extending into said casing, a cam member within said casing and mounted to rotate with said shaft, a plunger slidably mounted in said casing and adapted to engage with said cam member, a lever mounted on said casing and adapted to be actuated by said plunger, a slidably mounted detent member adapted to be actuated by said plunger, a slidably mounted detent member adapted to engage said lever and prevent the movement thereof, and a spring cooperating with said detent member to normally hold said detent member in engagement with said lever.

49. In a gun control assembly, means for transmitting force comprising a metal rod-like member, a spring cooperating with said rod-like member and holding it in one extreme position, and means cooperating with the opposite end of said rod-like member to move the latter in sudden pulsating movements in a direction opposite to that exercised by said spring.

50. In a gun control assembly an impulse generator operatively connected to a trigger motor by an impulse connection member, an impulse connection member adjusting device comprising a receiving member having a screw-threaded opening, a movable screw-threaded member fitted for movement in said screw-threaded opening, and a connection member extending into said movable member and having an enlarged end engaged with said movable member whereby said connection member may be moved lengthwise with respect to said receiving member and means preventing rotation of the connecting member with respect to the receiving member.

51. In a gun control assembly an impulse generator operatively connected to a trigger motor by an impulse connection member, an impulse connection member adjusting device comprising a receiving member having a screw-threaded opening, a movable screw-threaded member fitted for movement in said screw-threaded opening, a connection member extending into said movable member, means preventing rotation of the connection member with respect to the receiving member, and a shoulder on the connection member, said movable member adjusted to engage with said shoulder member whereby said connection member may be moved lengthwise with respect to said receiving member but not rotated thereto.

52. In a gun control assembly an impulse generator operatively connected to a trigger motor by an impulse connection member, an impulse connection member adjusting device comprising a receiving member having a screw-threaded opening, a movable screw-threaded member fitted for movement in said screw-threaded opening, a connection member extending into said movable member and having an annular shoulder in non-rotatable but slidable engagement with said receiving member, said movable member adapted to engage with said first shoulder whereby the connection may be moved lengthwise with respect to said receiving member but not rotated with respect thereto.

53. In a gun control assembly an impulse generator operatively connected to a trigger motor by an impulse connection member, an impulse connection member adjusting device comprising a receiving member having a screw-threaded opening, a movable screw-threaded member fitted for movement in said screw-threaded opening, a connection member extending into said movable member and having an enlarged end engaging with said movable member whereby said connection member may be moved lengthwise with respect to said receiving member, and a locking element co-acting with said receiving member and said connection member to prevent rotation of the latter.

54. In a gun control assembly an impulse generator operatively connected to a trigger motor by an impulse connection member, an impulse connection member adjusting device comprising a receiving member having a screw-threaded opening, a movable screw-threaded member fitted for movement in said screw-threaded opening, a connection member extending into said movable member, a shoulder on said connection member, said movable member adapted to engage with said first shoulder whereby said connection member may be moved lengthwise with respect to said receiving member but not rotated thereto, and a locking element co-acting with said receiving member and with said connection member to prevent rotation of the latter.

55. In a gun control assembly an impulse generator operatively connected to a trigger motor by an impulse connection member, an impulse connection member adjusting device comprising a receiving member having an axially located screw-thread opening and a longitudinally extending slot cut through the diameter of said receiving member, a movable screw-threaded member fitted for movement in said screw-threaded opening, a connection member extending into said movable member and having such an engagement with said movable member that the connection may be moved lengthwise but not rotated by said movable member, said connecting member provided with a locking member extending through said slot to prevent rotation of the former member.

56. In a gun control assembly an impulse generator operatively connected to a trigger motor by an impulse connection member, an impulse connection member adjusting device comprising a receiving member having an axially located screw-threaded opening and a longitudinally extending slot cut through the diameter of said receiving member, a movable screw-threaded member fitted for movement in said screw-threaded opening, a connection member extending into said movable member but not rotated by said movable member, radially projecting ears on said connection extending into said slot, and an annular shoulder on said movable member adapted to engage with said connection member.

57. In a gun control assembly an impulse generator operatively connected to a trigger motor by an impulse connection member, an impulse connection member adjusting device comprising a receiving member having an axially located screw-threaded opening and a longitudinally extending slot cut through the diameter of said receiving member, a movable screw-threaded member fitted for movement in said screw-threaded opening, a connection member extending into said movable member but not rotated by said movable member, radially projecting ears on said connection extending into said slot, an annular shoulder on said movable member adapted to engage with said connection member, and a locking element extending through said slot and engaging with said movable member to prevent rotation thereof.

58. In a gun control assembly, trigger mechanism including a hammer, a sear normally in engagement with said hammer, a trigger sear adapted to engage said hammer immediately upon disengagement thereof by said sear, and means driven from the propeller engine for disengaging said trigger sear from said hammer.

59. In a gun control assembly, trigger mechanism including a hammer, a sear normally in engagement with said hammer, a trigger sear adapted to engage said hammer immediately upon disengagement thereof by said sear, said trigger sear having an oblong slot therein adapted to permit longitudinal movement thereof with respect to said sear, a trigger sear operating finger mounted in conjunction with said sear and said trigger sear, and having a projection adapted to engage with said trigger sear to limit the longitudinal movement of said trigger sear, a spring in engagement with said trigger sear and holding the latter away from said projection while said sear is in engagement with said hammer, and means driven from the propeller engine for disengaging said trigger sear from said hammer.

60. In an automatic gun, a hammer, means to thrust said hammer in one direction, a safety sear and a sear each arranged to engage said hammer, said sear being arranged to yield slightly after the disengagement of said safety sear from said hammer, means mounted for movement independently of said sear adapted to be continuously vibrated during the operation of the gun, means operative upon the yielding of said sear to engage said first-named means with said sear whereby said sear releases said hammer, means to trip said safety sear and means to disengage said sear from said first-named means after the release of said hammer.

61. In an automatic gun, a hammer, means to thrust said hammer in one direction, a safety sear to engage said hammer, a sear to engage said hammer, said sear being adapted to yield slightly when engaged by said hammer, a trigger mounted for movement independently of said sear, means on said trigger to engage coacting means on said sear whereby both of said elements will move in unison, said means being engaged through the yielding movement of said sear, means to disengage said safety sear from said hammer, means to separate the sear and trigger after the disengagement of the sear from the hammer, and means to cause said trigger to vibrate continuously during the operation of the gun.

62. In an automatic gun, striking means, means to thrust the striking means in one direction, a safety sear and a yielding sear adapted to engage the striking means, a vibratory member mounted for movement independently of the sear, means on said sear and vibrating member adapted to engage and lock together said sear and vibrating member, when the sear is in retracted position, and means to disengage said safety sear from said striking means.

63. In an automatic gun, striking means, means for thrusting said striking means in one direction, a safety sear adapted to engage said striking means, means for disengaging said safety sear from said striking means, a trigger, a sear adapted to engage said striking means, said sear being mounted independently of and movable relative to said trigger, means on said trigger and sear adapted to engage and lock them together when the sear is in one position, and means to normally maintain the sear out of said position.

64. A gun control assembly, including a support, a gun mounted thereon, a power mechanism, an impulse generator, an impulse transmission operated thereby, and connected with the firing mechanism, a housing for said mechanism, and an adjustable thrust member connecting said housing with the support.

In testimony whereof I have affixed my signature.

ADOLPH L. NELSON.